(12) United States Patent
Pleple et al.

(10) Patent No.: US 10,536,589 B2
(45) Date of Patent: Jan. 14, 2020

(54) INTERACTIVE TERMINAL WITH AN ELECTRONIC UNIT CONTROLLING A PRINTER FOR PRINTING CONTENT, PARTICULARLY TEXTS, IN A RANDOM MANNER

(71) Applicant: SHORT EDITION, Tullins (FR)

(72) Inventors: Quentin Pleple, Grenoble (FR); Christophe Sibieude, Varces Allieres et Risset (FR)

(73) Assignee: SHORT EDITION, Tullins (FR)

( * ) Notice: Subject to any disclaimer, the term of this patent is extended or adjusted under 35 U.S.C. 154(b) by 0 days.

(21) Appl. No.: 15/559,168

(22) PCT Filed: Mar. 11, 2016

(86) PCT No.: PCT/EP2016/055232
§ 371 (c)(1),
(2) Date: Sep. 18, 2017

(87) PCT Pub. No.: WO2016/146501
PCT Pub. Date: Sep. 22, 2016

(65) Prior Publication Data
US 2018/0077301 A1    Mar. 15, 2018

(30) Foreign Application Priority Data
Mar. 18, 2015 (FR) ...................... 15 52246

(51) Int. Cl.
*H04N 1/00* (2006.01)
*G06F 3/12* (2006.01)

(52) U.S. Cl.
CPC ....... *H04N 1/00411* (2013.01); *G06F 3/1204* (2013.01); *G06F 3/1242* (2013.01); *H04N 1/00413* (2013.01); *H04N 1/00522* (2013.01); *H04N 2201/0082* (2013.01)

(58) Field of Classification Search
CPC ..... G06F 3/1242; G06F 3/1243; G06F 3/1256
See application file for complete search history.

(56) References Cited

U.S. PATENT DOCUMENTS

| | | | |
|---|---|---|---|
| 5,615,123 A * | 3/1997 | Davidson | G06T 11/60 493/458 |
| 5,737,729 A | 4/1998 | Denman | |
| 2003/0220712 A1 | 11/2003 | Butikofer | |
| 2009/0281903 A1 * | 11/2009 | Blatstein | G06Q 20/20 705/15 |
| 2013/0104047 A1 * | 4/2013 | Laursen | G06Q 30/00 715/738 |

OTHER PUBLICATIONS

Corresponding International application, application No. PCT/EP2016/055232, International Search Report dated May 19, 4 pages.

* cited by examiner

*Primary Examiner* — Nicholas Pachol
(74) *Attorney, Agent, or Firm* — Cooper Legal Group, LLC; Ronald M. Kachmarik

(57) ABSTRACT

An interactive terminal with a built-in electronic unit running a program and controlling a printer for printing content, particularly texts, more particularly literary texts, the printing of the content being random according to the selective application of pressure by a user on an area of interface with the terminal.

8 Claims, 2 Drawing Sheets

INTERACTIVE TERMINAL WITH AN ELECTRONIC UNIT CONTROLLING A PRINTER FOR PRINTING CONTENT, PARTICULARLY TEXTS, IN A RANDOM MANNER

TECHNICAL FIELD

The invention relates to an interactive terminal with an integrated electronic unit executing a program and controlling a printer for printing items of content, in particular texts, more particularly literary texts.

The aim of the invention is to enable random printing of an item of content depending on the selective pressing of a user on a zone for interfacing with the terminal.

PRIOR ART

Various interactive terminals are already known.

An interactive terminal enables autonomous public access to an item of content, which may be a multimedia item of content, for example, in particular with access to the Internet.

An interactive terminal is an automatic system, without any human accompaniment, which makes it possible to access, through an individual and autonomous consultation and by virtue of the integrated electronic unit executing a program, items of content that are designed to be shown, in particular on a screen.

The items of content offered by the terminal must be very legible, in particular for elderly people, and easy to consult when multimedia items of content are involved.

In the case of interactive terminals with a screen, as an interface, a user is able to interact, using chosen menus, with the electronic unit integrated into the terminal, by pressing on buttons that are generally separate areas depicted on the screen, when the latter is tactile. The choices made by selective and successive presses of the user lead said user completely autonomously to the information sought. Mention may be made here of interactive terminals intended to indicate to a user precise information, for example a sum to be withdrawn in the case of banknotes, a schedule, one or more places and a sum of money to be disbursed in the case of passes or tickets for travel, shows or otherwise.

It is possible to classify items of content that are currently able to be printed with the aid of known interactive terminals, which incorporate a printer, into two categories.

They may be carriers of a given format on which information is printed, the content of which information is predictable for a user since said information results entirely from the choices of said user, in particular from menus proposed by the electronic unit integrated into the terminal, such as into a terminal for withdrawing money or for printing tickets or passes outlined above.

They may also be carriers of a given format on which information is printed, the content of which information is predictable for the user and which information results solely from the electronic unit of the interactive terminal. For example, they may be numbers or codes on queue tickets printed by interactive queue management terminals, which queue tickets are automatically incremented by the electronic unit.

Now, the inventors have demonstrated a certain need for information that is fun, since it is not able to be predicted by individuals, in public areas where waiting is required, the duration of which waiting may vary.

Providing printed brochures on a desk, even if their content may be a distraction, is predictable results solely from the individual choices of the user who, by definition, chooses his printed brochure.

The interactive terminals that are currently known are not really able to fill this gap because, as mentioned above, they deliver printed information, the content of which is predictable for the user.

There is a need to improve interactive terminals with an electronic unit executing a program and controlling a printer housed in their structure, in particular so that a given user obtains printed information, the content of which is unpredictable for a user.

The general aim of the invention is to at least partially meet this need.

DISCLOSURE OF THE INVENTION

To this end, the subject of the invention, according to one of its aspects, is an interactive terminal for the random printing of items of content, such as texts and/or images, comprising:
  a structure that is self-supporting or designed to be fixed on a wall,
  an interface with a user, comprising at least two separate interface zones,
  a printer housed in the structure, designed to print items of content available to the user,
  an electronic unit housed in the structure, designed to execute a program and to act automatically on the printer in response to a selective press on one of the interface zones in order to print an item of content, the program randomly determining the item of content to be printed depending on the interface zone on which the press is performed.

Thus, the invention consists in making the item of content printed by the interactive terminal random, which item of content therefore does not depend entirely on the choice of the user, said user making an initial choice of interactive zone on which he presses.

Thus, the interactivity with the terminal is made fun for a user who, although he knows what kind of information he will have by selecting a given interface zone, does not know the final content that will be printed by the terminal.

Furthermore, the unpredictability for a user is ensured upon each press on an interface zone since, according to the invention, two successive presses generate two different printed items of content.

The advantage of having printed items of content furthermore enables access to items of content for a large number of users in a limited time.

The interactive terminal, according to the invention, may thus be used in a public place where waiting is necessary, and in which a large number of people may be present.

Advantageously, the program furthermore determines a number and/or a code that are/is incremented upon each new selective press on one of the interface zones, irrespective of the zone, the incremented number and/or code being printed in addition to the item of content.

Thus, for example, the terminal makes it possible, in addition to delivering a printed item of content to users, to manage a queue of users, in particular in front of counters.

Preferably, the items of content to be printed are texts and/or images.

More preferably, the items of content being literary texts, such as poems, novels or extracts from fictional works, or illustrated texts, in particular cartoon extracts.

The interface may be a touchscreen with at least two separate tactile zones, or be made up of separate pushbutton-type buttons mounted in a wall of the structure.

According to one advantageous mode, presses offset in time on one and the same interface zone generate printed items of content that are different but substantially on the same theme, from the same literary category, of the same literary quality or from the same genre, such as a novel, a poem, an extract from a fictional work, or an illustrated text.

According to one advantageous variant, presses offset in time on one and the same interface zone generating printed items of content that are different but substantially of the same determined length.

According to one preferred application, the items of content are literary texts and the terminal comprises at least three separate interface zones, the length of the printed texts generated by selectively pressing on each of these three separate zones corresponding to a reading time by the user of the order of one, three and five minutes, respectively.

It may advantageously be provided that the memory of the electronic unit incorporates a number of at least one hundred different items of content to be printed.

The interactive terminal advantageously comprises an autonomous power source, such as a battery, housed inside the structure, for powering the printer and/or the electronic unit.

Another subject of the invention is a computer program product comprising code instructions making it possible, when the latter are executed in an interactive terminal, to cause the interactive terminal to:
  enable the user to select one of at least two content options, in particular using an interface such as a touchscreen or such as pushbuttons,
  randomly determine an item of content depending on the content option selected by the user,
  drive a printer housed in the structure of the terminal so as to print the determined item of content.

The code instructions may furthermore make it possible to cause the interactive terminal to determine a number and/or a code that are/is incremented upon each new selective press on one of the interface zones, irrespective of the zone, and to print the incremented number and/or code in addition to the content.

DETAILED DESCRIPTION

Other advantages and features of the invention will emerge more clearly on reading the detailed description of exemplary implementations of the invention, given by way of non-limiting illustration and with reference to the following figures, in which.

Figure 1:
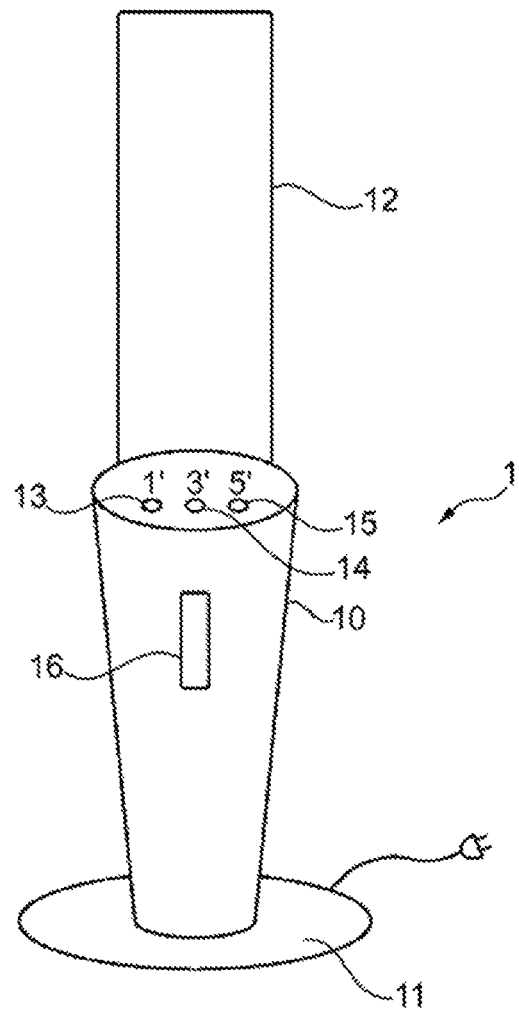
FIG. 1 is a schematic view of an example of an interactive terminal according to the invention.
Figure 2:
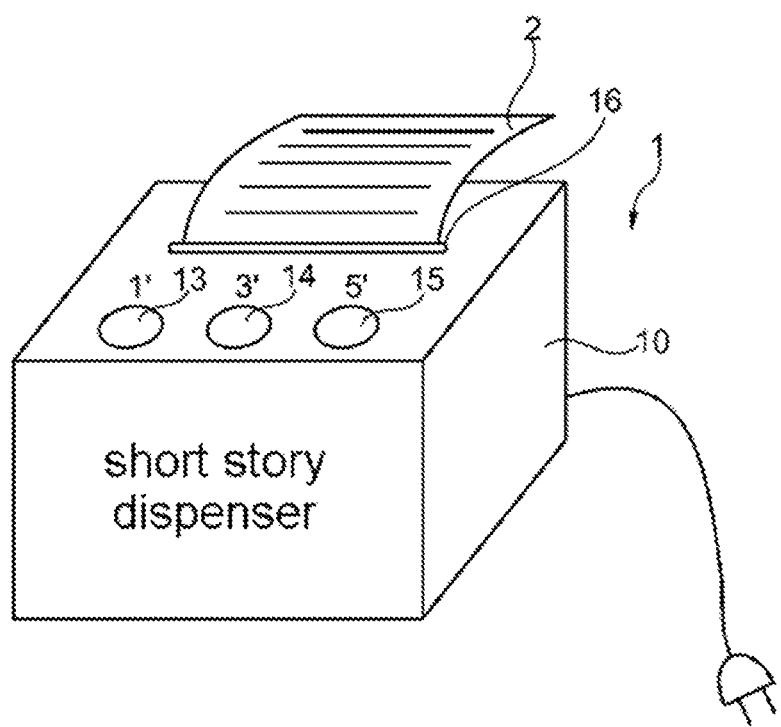
FIG. 2 is a schematic view of another example of an interactive terminal according to the invention.

In one advantageous application, the interactive terminals 1 according to the invention, illustrated in FIGS. 1 and 2, make it possible to randomly print short literary texts in the form of poems.

As illustrated in FIG. 1, the interactive terminal 1 according to the invention comprises firstly a self-supporting structure comprising a frame 10 fixed above a base 11.

A panel 12 may be fixed above the structure 10, to inform the potential users of the presence of the interactive terminal. The panel may be made luminous in particular by light-emitting diodes, in order to make the terminal more visible. This may be advantageous in a public place where individuals are not aware of the presence of the terminal.

The interactive terminal 1 illustrated comprises three pushbuttons 13, 14, 15 mounted in the horizontal wall of the frame 10. A different duration is written above each of the buttons. In the example illustrated, "1 minute" is written above the button 13, "3 minutes" above the button 14, and "5 minutes" above the button 15.

Inside the frame 10 are housed a printer and an electronic unit, preferably comprising a computer with a memory connected electrically on the one hand to the pushbuttons 13, 14, 15 or to the interface zones and on the other hand to the printer.

The printer is designed to print items of content available to the user, said items of content exiting the interactive terminal 1 via a slot 16 formed for this purpose in the vertical envelope of the frame 10.

According to the invention, the electronic unit is designed to execute a program and to act automatically on the printer in response to a selective press on a pushbutton 13, 14 or 15 in order to print a poem, the program randomly determining the poem to be printed depending on the pushbutton 13, 14 or 15 on which the press is performed.

Thus, for example, a user wishing to read a poem of a duration substantially equal to one minute will press on the button 13. The interactive terminal 1 then randomly delivers to said user a printed poem of this duration and that is initially unknown to the user, this poem being stored among a set of poems of the same reading duration in the memory.

The poems that require a reading of around three and five minutes are printed and delivered in response to a press on the button 14 and on the button 15, respectively.

The random determination of the poem to be printed for a user makes it possible for one and the same user who presses twice successively on one and the same button 13, 14, or 15 not to obtain one and the same poem.

According to one advantageous variant, the program of the computer furthermore determines a number and/or a code that are/is incremented upon each new selective press on one of the buttons 13 to 15, irrespective of the zone, the incremented number and/or code being printed in addition to the content.

The interactive terminal 1 may thus be used to manage a queue at one or more counters.

Instead of providing a self-supporting structure with a frame 10 fixed to a base 11 as shown in FIG. 1, a printer and a computer of smaller dimensions may be provided and integrated into a housing 10 as shown in FIG. 2.

The interactive terminal 1 thus shown in FIG. 2 is more easily portable than that shown in FIG. 1 and may be used for more temporary uses.

The invention is not limited to the examples that have just been described; it is possible in particular to combine features of the examples illustrated with one another in variants that are not illustrated.

Other variants and improvements of the invention may be realized without departing from the scope of the invention.

Thus, if the zones for interfacing with the user are pushbuttons in the examples illustrated, the interface may also be a touchscreen with clearly separated interface zones.

It goes without saying that it is possible to provide more interactive zones than three pushbuttons 13, 14, 15 as shown in FIGS. 1 and 2.

The applications envisioned for the interactive terminal 1 according to the invention are numerous.

First of all with regard to the content, it is possible to provide, instead of poems of different reading durations, it is possible to provide other literary texts, such as extracts from fictional works or illustrated extracts, such as cartoon extracts.

Instead of different reading durations, it may be provided that the selective choice by pressing on the interface zones relates to different content categories.

For example, a press on a given interface zone, such as on one of the buttons 13 to 15, may generate a delivery of a printed poem, a press on another interface zone may generate a cartoon extract, and a press on yet another interface zone may generate a mathematical problem.

The invention claimed is:

1. An interactive terminal for printing of items of content that includes at least one of texts and images, with the content to be printed not being specifically selected by a user and the user does not know the final content that will be printed, the interactive terminal comprising:
    a structure that is self-supporting or designed to be fixed on a wall,
    an interface with a user, comprising at least two separate interface zones,
    a printer housed in the structure, designed to print items of content available to the user,
    an electronic unit housed in the structure, designed to execute a program and to act automatically on the printer in response to a selective press on one of the interface zones in order to print an item of content, the program determining the item of content to be printed, without the user selecting final content that will be printed and without the user knowing final content that will be printed, with the content to be printed depending on the interface zone on which the press is performed.

2. The interactive terminal as claimed in claim 1, wherein the program furthermore determines at least one of a number and a code that is incremented upon each new selective press on one of the interface zones, irrespective of the zone, the incremented at least one of number and code being printed in addition to the item of content.

3. The interactive terminal as claimed in claim 1, wherein the items of content to be printed being at least one of texts and images.

4. The interactive terminal as claimed in claim 3, the items of content including at least one of literary texts which includes at least one of poems, novels and extracts from fictional works, and illustrated texts.

5. The interactive terminal as claimed in claim 1, the interface being a touchscreen with at least two separate tactile zones, or being made up of separate pushbutton-type buttons mounted in a wall of the structure.

6. The interactive terminal as claimed in claim 1, presses offset in time on one and the same interface zone generating printed items of content that are on the same theme, from the same literary category, of the same literary quality or from the same genre including at least one of a novel, a poem, an extract from a fictional work, or an illustrated text.

7. The interactive terminal as claimed in claim 1, presses offset in time on one and the same interface zone generating printed items of content that are different but of the same determined length.

8. The interactive terminal as claimed in claim 1, the memory of the electronic unit incorporating a number of at least one hundred different items of content to be printed.

\* \* \* \* \*